Dec. 4, 1956 J. MERCIER ET AL 2,772,690
BLEEDER VALVE
Original Filed Feb. 19, 1946
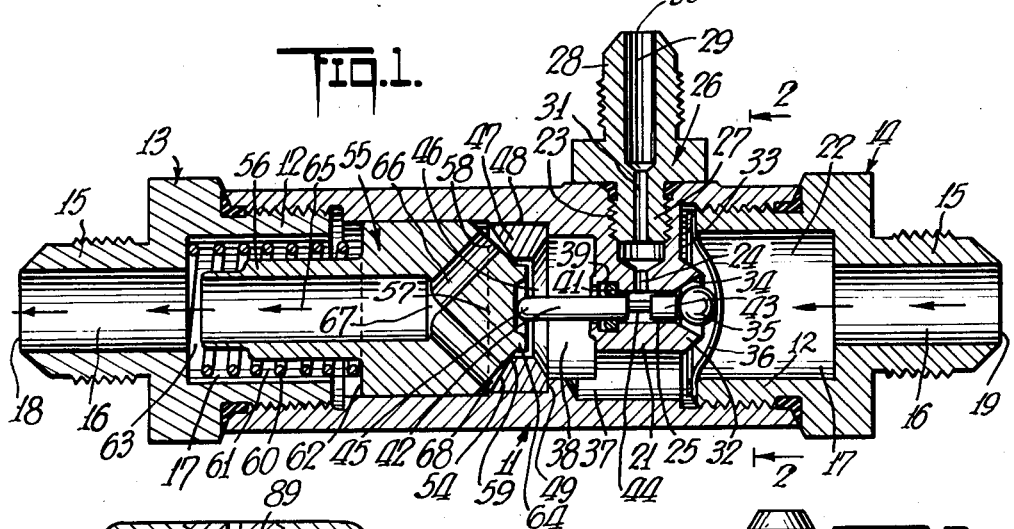
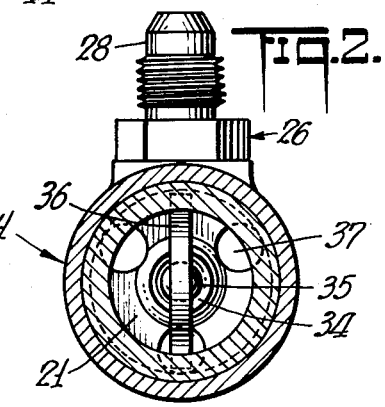
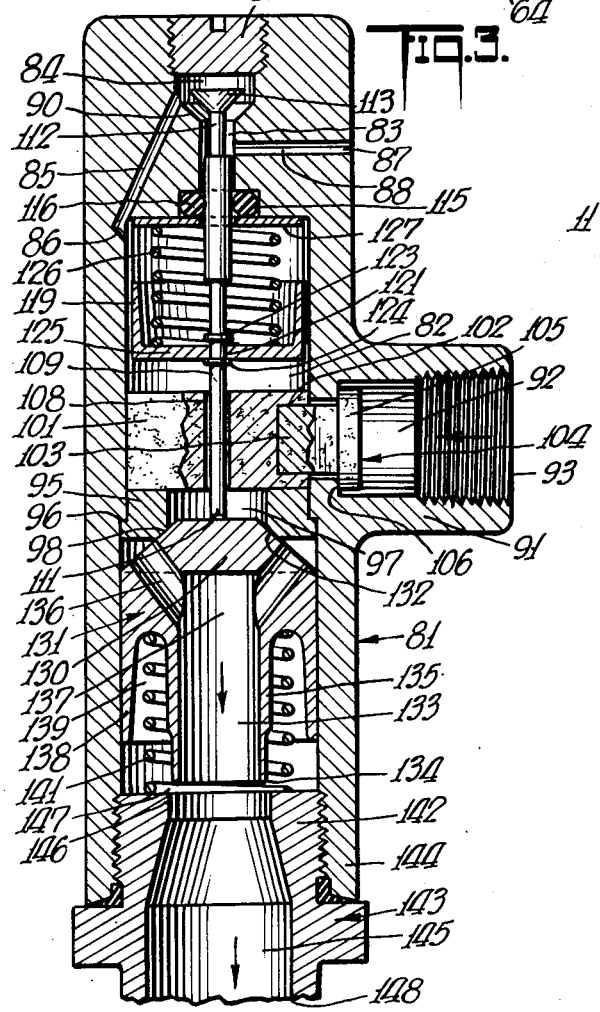
INVENTOR
Jean Mercier
Jacques H. Mercier
Dean Fairbank & Hirsch
ATTORNEYS

United States Patent Office 2,772,690
Patented Dec. 4, 1956

2,772,690

BLEEDER VALVE

Jean Mercier and Jacques H. Mercier, New York, N. Y.

Continuation of abandoned application Serial No. 648,711, February 19, 1946. This application March 31, 1953, Serial No. 345,986

16 Claims. (Cl. 137—119)

This invention relates to the art of valves, more particularly of the type to provide bleeding under predetermined conditions of operation from the output line of a pump delivering fluid under pressure.

Where the proportion of gas to liquid delivered by a fluid pump is so high that if fed to a hydraulically operated unit, malfunctioning thereof might result, serious consequences may occur especially where the unit controls the brake of a vehicle, for example.

Where the output of a fluid pump driven by an electric motor is delivered to a closed system filled with liquid, the starting load on the motor, unless it is of considerably greater size than that required for normal operation of the pump, may be so great as to cause excessive heating with possible breakdown of such motor.

It is accordingly among the objects of the invention to provide a bleeder valve that is compact, relatively simple in construction, having but few parts that are not likely to become deranged, which may readily be manufactured by mass production methods, and which will automatically and dependably bleed fluid from a fluid pressure line when the proportion of liquid to gas in such line is below a predetermined amount and when the proportion of liquid to gas exceeds such amount will quickly stop further bleeding action.

Another object is to provide a valve of the above type which, when installed in a pressure line of a closed system adjacent the outlet of the pump supplying such system, will, at the start of the pumping action, provide a vent to atmosphere for the output of such pump to minimize the load on the pump motor.

Another object is to provide a valve of the above type which will bleed accumulated gas from a pressure system with substantially no interference with its normal operation.

According to the invention, the valve comprises a casing having an inlet port, an outlet port and a bleeder port. The outlet port is normally closed and cut off from communication with the inlet port by a main valve member which controls a second or auxiliary valve member associated with the bleeder port and retaining the latter open and in communication with the inlet port when the outlet port is closed, for bleeding of gas and liquid from the valve.

The main valve member is normally retained in closed position until the pressure exerted thereagainst by the fluid forced into the inlet port rises above a predetermined amount, at which time the main valve member will move off its seat and fluid will flow therepast. By means of venturi action the main valve member will remain open as long as the rate of flow of the fluid is above a predetermined amount and the auxiliary valve member will close the bleeder port.

In a specific embodiment of the invention, the auxiliary valve member associated with the bleeder port is moved off its seat to open position even when the main valve member is open, to relieve gas that may accumulate in the valve. For this purpose, a slidable piston is mounted between two spaced collars fixed on the stem of the auxiliary valve member. Thus, as gas accumulates in the valve, slight pulsation due to the pumping action will cause oscillation of the piston. When sufficient gas has accumulated so that the amplitude of the oscillation of the piston will cause the latter to abut against the uppermost collar, the valve stem will be moved upwardly to unseat the auxiliary valve member for bleeding of such gas.

This application is a continuation of the subject matter of co-pending application Serial No. 648,711, filed February 19, 1946 which is a continuation-in-part of application Serial No. 567,579, filed December 11, 1944, both prior applications being now abandoned.

In the accompanying drawings in which are shown one or more of various possible embodiments of the several features of the invention, Fig. 1 is a longitudinal cross sectional view of the valve in horizontal position, Fig. 2 is a transverse cross sectional view of said valve taken along line 2—2 of Fig. 1, and Fig. 3 is a view similar to Fig. 1 of another embodiment of the valve in vertical position.

Referring now to the drawings, the bleeder valve shown in Fig. 1 desirably comprises a cylindrical casing 11 which desirably is internally threaded at each end to receive the correspondingly threaded extension 12 of a hollow plug 13, 14, respectively, each of which may have a nipple 15 extending outwardly therefrom.

Each of the plugs desirably has a longitudinal bore 16 therethrough of enlarged diameter at its inner end as at 17, the bores in plugs 13 and 14 defining the outlet and inlet ports 18, 19 of the casing 11.

The valve has a bleeder section between the outlet and inlet ports 18 and 19 which desirably comprises a partition 21, preferably formed integral with the casing 11, said partition and plug 14 defining a fluid inlet chamber 22. The partition 21 has a radial bore 23 extending inwardly from the outer surface of the casing 11, which is of reduced diameter as at 24 at its inner end and leads into an axial bore 25 extending through said partition. A plug 26 desirably has its stem 27 threaded into bore 23, said plug 26 desirably having an external nipple 28 with a bore 29 extending therethrough defining a bleeder port 30 at its outer end and of reduced diameter at its inner end as at 31.

The partition 21 desirably has an annular boss 32 on its surface 33, which encompasses the end of axial bore 25 leading into chamber 22 and which defines a seat 34 for a ball valve 35, normally retained on its seat to seal said bore 25 as by means of a bowed leaf spring 36 retained in position by the inner end of extension 12 of plug 14.

The partition desirably has a plurality of bores 37 therethrough extending parallel to axial bore 25 and radially displaced therefrom which provide communication between inlet chamber 22 on one side of the partition 21 and a pressure chamber 38 on the other side.

The end of axial bore 25 leading into pressure chamber 38 is desirably of enlarged diameter as at 39 to form a cavity in which a resilient O ring 41 is positioned, said ring 41 serving as a seal and a slide bearing for an elongated pin 42 which extends through bore 25. The pin 42 is desirably of reduced diameter as at 43 at one end thereof adjacent seat 34 and has an annular groove 44 which normally is aligned with bore 24. The other end 45 of pin 42 which protrudes from bore 25, extends into the opening 46 of an annular member 47 affixed in the bore 48 of the casing 11 against an internal annular shoulder 49. The member 47 desirably has a beveled face 54 on its surface remote from pressure chamber 38 which defines a valve seat.

Slidably mounted in the bore 48 of casing 11 between valve seat 54 and plug 13 is a cylindrical piston 55 which desirably has a reduced diameter stem 56. The end 57 of piston 56 which defines a valve head is desirably beveled as at 58 at an angle slightly greater than that of valve seat 54 so that when moved against said seat 54 in the manner hereinafter described, the inner edge 59 of said seat 54 will engage the beveled surface 58 to form a relatively narrow sealing region.

The valve head 57 is normally retained against its seat 54 by means of a coil spring 60 of greater strength than leaf spring 36, encompassing the stem 56 of the piston and positioned in a cavity 61 formed between stem 56 and extension 12 of plug 13, said spring being compressed between the inner surface of plug 13 and the shoulder 62 formed by stem 56, the end of said stem 56 being spaced slightly from the extension 12 of plug 13 to define an inlet 63 into said cavity.

The valve head 57 of piston 55 desirably has an annular boss 64 extending outwardly therefrom and the end 45 of pin 42 abuts against said valve head being encompassed by boss 64. The pin 42 is of such length, that when valve head 57 is seated, the end 43 of said pin 42 will retain ball valve 35 spaced from its seat 34 to permit flow from chamber 22 into axial bore 25 and through bores 24, 31 and 29 out of outlet port 30.

The piston 55 desirably has a longitudinal bore 65 extending through its stem 56 to near valve head 57 and said bore is longitudinally aligned with bore 16 in plug 13. In addition, a plurality of bores 66 extend from the end 67 of bore 65 through the beveled face 58 of valve head 57 leading into the space 68 formed between the adjacent beveled surfaces 54 and 58.

The valve shown in Figs. 1 and 2 may be connected for example in a pressure line leading from a pump (not shown) of a hydraulic system.

When the pump is initially started, both liquid and gas would be forced from the reservoir supplying the pump into the inlet port 19 of casing 11, into liquid chamber 22 and through bores 37 into pressure chamber 38. As the pressure on the liquid due to the pumping action would initially be low, the main valve head 57 will remain seated by reason of coil spring 60.

As the liquid and gas forced into chamber 22 will also flow around ball valve 35 and through bores 25, 24, 31 and 29 to bleed through port 30, a relatively small load will be placed on the motor driving the pump. Where an electric motor is used for this purpose, the starting load thereon will thus be at a minimum thereby preventing excessive heating.

As the pump motor picks up speed and as the proportion of liquid to gas increases, the pressure of the liquid in the pressure chamber 38 will gradually rise due to the restricted discharge through the relatively small bores 25, 24 and 31 until it is sufficient to overcome the force exerted by coil spring 60. As a result, main valve head 57 will move slightly off its seat 59 to permit flow of fluid through bores 37, 66 and 65 and through outlet port 18 into the hydraulic system.

The initial movement of the main valve head 57 though sufficient to permit flow of fluid, will not cause pin 42 to move sufficiently for ball valve 35 to seat. Consequently, gas and liquid will still bleed through port 30.

Due to the initial movement of valve head 57 off its seat 54, a restricted passageway will be provided with resultant increase in the velocity of flow of the fluid with respect to its rate of flow into liquid chamber 22.

As the high velocity fluid flows past the end of stem 56 and inlet 63, a venturi action will be created which will cause a suction to be created in the cavity 61 with the result that the pressure therein will be considerably less than in the pressure chamber 38.

As the difference in pressure is much greater than the force exerted by spring 60, the piston 55 will move further to the left as will pin 42 so that ball valve 35 will seat to seal bore 25 to stop further bleeding action which is not desired at this time due to the negligible quantity of gas in the liquid after the pumping action has allowed a constant average value.

If not for the venturi action, after the valve head 57 was displaced sufficiently to permit closing of ball valve 35, the pressure on both sides of piston 57 would be substantially identical with the result that spring 60 would again seat valve head 57 for resumption of the bleeding action. Thus, the piston 55 would thereupon oscillate with resultant undesirable chatter and intermittent output of liquid from the outlet port 18.

With the construction above described, as long as the rate of flow of liquid is high enough to create sufficient suction to overcome the normal effect of spring 60, valve head 57 remains open and ball valve 35 remains closed with the result that all of the liquid forced into casing 11 will flow into the hydraulic system.

If a sufficient quantity of gas should be forced by the pump into the valve casing 11 to reduce the rate of flow below that required to provide sufficient suction to overcome spring 60, valve head 57 would again seat to open ball valve 35 to again bleed liquid and gas.

It is apparent therefore that automatic control of the bleeding action is provided by the valve shown in Figs. 1 and 2 to prevent an excessive amount of gas in the hydraulic system which might cause malfunctioning of the equipment to be operated.

The embodiment of the valve shown in Fig. 3 is designed for operation in a generally vertical position. The valve comprises a substantially cylindrical casing 81 having a bore 82 extending longitudinally therethrough which is of reduced diameter near its upper end as at 83. Bore portion 83 leads into a cavity 84 which is in communication with the larger diameter portion of bore 82 through a passageway 85 having its inlet 86 adjacent the upper end of said larger diameter portion. The casing 81 has a bleeder port 87 connected by transverse bore 88 to bore portion 83.

The cavity 84 is desirably sealed by a threaded plug 89 and the portion of cavity 84 adjacent the upper end of reduced bore portion 83 is beveled as at 90 to define a valve seat.

The casing 81 desirably has a laterally extending boss 91 preferably formed integral therewith which has a bore 92 leading into the bore 82 of the casing, the outer end of bore 92 defining a liquid inlet port 93.

Positioned in the bore 82 of casing 81 is an annular member 95 securely retained against an internal annular shoulder 96, the opening 97 in member 95 defining a pressure chamber. The lower edge of said opening 97 is desirably beveled as at 98 to define a valve seat. Positioned in bore 82 and resting on member 95 is a circular block 101 preferably of porous bonze which is transversely aligned with the bore 92 in boss 91.

The block 101 desirably has a cavity 102 aligned with bore 92 in which is snugly affixed the end 103 of a plug 104 also of porous bronze, the head 105 of said plug being seated against an annular shoulder 106 in bore 92.

The block 101 desirably has an axial bore 108 through which extends a cylindrical valve stem 109 which is of such length that its lower end 111 extends into the opening 97 in annular member 95 and its upper end 112 extends through and beyond bore 83 into cavity 84. A beveled valve head 113 is affixed to end 112 of stem 109 and is adapted to move against seat 90 to seal bore 83.

The lower end of bore 83 is desirably of enlarged diameter as at 115 defining a cavity in which a resilient O ring 116 is positioned, said O ring providing a seal about the valve stem 109 and also providing a sliding bearing for said stem.

Positioned in bore 82 between block 101 and the inlet 86 of passageway 85 is a substantially cup-shaped piston 119 of outer diameter slightly less than the diameter of bore 82 to provide clearance therebetween, said piston having an axial bore 121 through which stem 109 extends.

The stem 109 desirably has a pair of spaced collars 123 and 124 affixed thereto and straddling the floor 125 of piston 119 which is movable with respect to stem 109 between such collars. The floor of piston 125 is normally retained against the lowermost collar 124 by means of a coil spring 126 compressed between floor 125 and a washer 127 encompassing stem 109, said spring also urging valve head 113 to sealed position.

Slidably mounted in the bore 82 of casing 81 beneath annular member 95 is a piston 131 conformed as a valve head 130 at one end and desirably having a beveled face 132 which is normally retained against valve seat 98 in the manner hereinafter described to seal opening 97.

The piston 131 desirably has a longitudinal bore 133 extending from the end 134 of its stem 135 to near the beveled head 130 and a plurality of bores 136 extend from the upper end 137 of bore 133 through the beveled face 132. The piston also has an annular skirt 138 preferably formed integral therewith extending toward end 134, parallel to and spaced from stem 135 defining a cavity 139 in which a coil spring 141 is positioned, said spring being stronger than spring 126. The coil spring 141 is compressed between the end of cavity 139 and the inward extension 142 of a plug 143 threaded into the end 144 of the casing and normally urging the valve head 130 of the piston 131 to seated position. The plug 143 desirably has a bore 145 therethrough of diameter at its inner end 146 slightly larger than the outer diameter of end 134 of piston 131 which is normally spaced from the end 146 of said bore 145 to define an inlet 147 into cavity 139 when valve head 132 is seated. Bore 145 at its outer end defines an outlet port 148 which is aligned with bore 133 of piston 131.

The valve stem 109 is of such length the when valve head 132 is seated and the end 111 of stem 109 abuts thereagainst, the valve head 113 will be retained off its seat 90 to provide communication between bores 82 and 88 through passageway 85.

The operation of the valve shown in Fig. 3 is in many respects similar to that shown in Figs. 1 and 2. Thus, the port 93 is connected in the portion of a pressure line leading from a pump and the port 148 is connected to the portion of such line leading to the hydraulic system.

When the pump is initially started, both liquid and gas would be forced into port 93, through plug 104 and block 101 into pressure chamber 97 and into the portion of bore 82 above block 101. As the pressure on the liquid due to the initial pumping action would be relatively low, the main valve head 132 will remain seated by reason of coil spring 141.

As a result, the liquid and gas forced through plug 104 and block 101 will flow around the piston 119 and through passageway 85, open bore 83 and transverse bore 88 to bleed through port 87 and also to minimize the load on the pump motor.

As the pump motor picks up speed and as the proportion of liquid to gas increases, due to the relatively small bleeder bore 88 and the relatively small clearance around piston 119, the pressure of the liquid in the pressure chamber 97 will gradually rise until it is sufficient to overcome the force exerted by spring 141. Valve head 130 will thereupon move slightly off its seat 98 to permit flow of fluid through bores 136 and 133 for discharge from outlet port 148 into the hydraulic system.

The initial downward movement of the valve head 130, though sufficient to permit flow of liquid, will not cause stem 109 to move sufficiently for auxiliary valve head 113 to seat. Consequently, gas and liquid will still bleed from port 87. As the porous bronze block 101 and plug 104 aids in the separation of gas from the liquid, such gas together with only a small quantity of liquid will be discharged from bleeder port 87 and the major portion of the liquid forced into the valve casing will be discharged through port 148 together with the relatively small quantity of gas that may remain in such liquid.

Due to the initial movement of valve head 130 off its seat 98, a restricted passageway will be provided with resultant increase in the velocity of the flow of fluid with respect to its rate of flow into bore 93.

As the high velocity fluid flows past the inlet 147 to cavity 139, a venturi action will be created which will cause a suction to be created in such cavity 139 with the result that the pressure therein will be considerably less than that in pressure chamber 97.

As the difference in pressure is much greater than the force exerted by spring 141, the piston 131 and stem 109 will move further downwardly so that valve head 113 will seat to seal bore 88 to stop further bleeding action which is not desired at this time due to the negligible quantity of gas in the liquid after the pumping action has attained a constant average value.

If not for the venturi action, after the valve head 130 was displaced sufficiently to permit closing of valve head 113, the pressure on both sides of piston 131 would be substantially identical with the result that spring 141 would again seat valve head 130 and open valve head 113 for resumption of the bleeding action. The piston 131 would thereupon oscillate with resultant chatter and intermittent output of liquid from the outlet port 148.

With the construction above described, as long as the rate of flow of liquid is high enough to create sufficient suction to overcome the normal effect of spring 141, valve head 130 remains open and valve head 113 remains closed with the result that all of the fluid forced into port 93 of casing 81 will flow into the hydraulic system.

With valve head 130 seated, the pressure on both sides of piston 119 will be substantially identical and the spring 126 will retain the floor 125 of piston 119 against collar 124. As liquid flows through the valve, there will be a tendency for any slight quantity of gas in such liquid to rise to the top of bore 82. As the result of small pressure variations in the line due to the pumping action, the piston 119 will tend to oscillate slightly. As the quantity of gas entrapped in the top of bore 82 increases the pressure variations will cause greater oscillation of piston 119 between collars 123, 124 and when the quantity of gas has reached such an amount that the oscillation of the piston will cause it to hit collar 123 with considerable force, the valve stem 109 will be raised slightly causing valve head 113 to move off its seat so that the entrapped gas can bleed through open port 83 and bore 88 through bleeder port 87. When the gas has bled out and liquid takes its place, as the liquid is substantially incompressible, the piston 119 will no longer oscillate and valve head 113 will remain seated.

Thus, the operation above described affords periodic bleeding of accumulated gas through the bore 88 even during normal operation of the system.

If such a quantity of gas should be forced by the pump into the valve casing to reduce the rate of flow below that required to provide sufficient suction to overcome spring 141, valve head 130 would again seat to open valve head 113 to again bleed liquid and gas.

It is apparent therefore that automatic control of the bleeding action is provided by the valve shown in Fig. 3 to prevent an excessive amount of gas in the hydraulic system which might cause malfunctioning of the equipment to be operated.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A bleeder valve comprising a casing having an inlet port, an outlet port and a bleeder port, a main valve controlling flow from said inlet port to said outlet port, resilient means normally retaining said main valve in closed position, an auxiliary valve controlling flow from said inlet port to said bleeder port, means normally urging said auxiliary valve to closed position, means operatively connecting said two valves and retaining said auxiliary valve in open position when said main valve is closed, and means associated with said main valve when said main valve is open, upon liquid flow to produce suction by venturi effect to overbalance the resilient means normally retaining the main valve in closed position, whereby when the liquid flow rate falls below a predetermined amount required to overbalance the resilient means, said main valve will close to open said auxiliary valve for bleeding of liquid and gas through said bleeder port.

2. The combination set forth in claim 1 in which the means operatively connecting said two valves comprises a slidable member therebetween of length such that when the main valve is closed the auxiliary valve will be open.

3. The combination set forth in claim 1 in which resilient means normally urge said auxiliary valve to closed position, the resilient means associated with the main valve being stronger than the resilient means associated with the auxiliary valve.

4. The combination set forth in claim 1 in which the resilient means associated with said main valve is a coil spring and the means to produce suction by venturi effect comprises a cavity in said valve casing for said spring, said main valve having a bore defining a fluid passageway aligned with the outlet port, the end of said valve bore being slightly spaced from said outlet port to define an inlet into said cavity whereby upon flow of fluid from said valve bore through said outlet port past the inlet of said cavity, a suction will be created in said cavity.

5. The combination set forth in claim 1 in which said casing has an annular member defining a valve seat, the main valve member comprises a piston having a head resiliently retained against said seat by a coil spring, and a pressure chamber is provided between said main valve member and said inlet port.

6. The combination set forth in claim 1 in which said casing has an annular member defining a valve seat, the main valve member comprises a slidable piston having a head resiliently retained against said seat by a coil spring, and the means to provide suction by venturi effect comprises a cavity in said valve casing for said spring, said piston having a longitudinal bore defining a fluid passageway and additional bores leading from the valve head to said passageway and normally closed when said valve head is seated, said fluid passageway being aligned with the outlet port, the end of said valve bore being slightly spaced from said outlet port to define an inlet into said cavity, whereby upon flow of fluid from said valve bore through said outlet port past the inlet of said cavity, a suction will be created in said cavity.

7. A bleeder valve comprising a substantially cylindrical casing having an inlet port at one end an outlet port at the other and a bleeder port therebetween, a pressure chamber in said casing between said inlet and outlet ports, a valve seat on one side of said chamber, a piston having a valve head at one end slidably mounted in said casing, resilient means normally retaining said valve head on said seat, said piston having bores therethrough providing communication between said pressure chamber and said outlet port and normally closed when said valve head is seated, an inlet chamber in communication with said inlet port, a partition between said chambers having a bore therethrough to provide communication therebetween, a second bore through said partition in communication with said bleeder bore, an auxiliary valve, resilient means normally urging said auxiliary valve to seal said second bore, a pin extending through said second bore abutting at its respective ends against said main valve head and said auxiliary valve, said pin being of length such that when the main valve head is seated the auxiliary valve head will be spaced from the adjacent end of said second bore and of diameter to permit flow through said second bore into said bleeder port when the auxiliary valve head is spaced from said end, and means associated with said piston upon liquid flow, to produce suction by venturi effect to overbalance the resilient means associated with the main valve head, whereby when the liquid flow rate falls below the predetermined amount required to overbalance said resilient means said main valve will close to open said auxiliary valve for bleeding of liquid and gas from said bleeder port.

8. The combination set forth in claim 7 in which the end of the second bore in said inlet chamber is conformed as a valve seat and the auxiliary valve member is a ball valve.

9. The combination set forth in claim 7 in which the end of the second bore in said inlet chamber is conformed as a valve seat and the auxiliary valve member is a ball valve, the resilient means associated therewith being a leaf spring of strength less than that of the resilient means associated with said piston.

10. The combination set forth in claim 7 in which both the valve seat and the valve head have beveled faces the angle of one of said beveled faces being greater than the other so that when the valve head is seated, the width of the contacting surfaces will be relatively narrow.

11. A bleeder valve comprising a substantially cylindrical casing having a longitudinal bore extending therethrough of reduced diameter at one end and having a cavity aligned with said reduced diameter bore and in communication therewith and with the longitudinal bore in said casing, said casing having a bleeder port leading into said reduced diameter bore, an outlet port at its end remote from said reduced diameter bore and an inlet port leading into said longitudinal bore between said bleeder port and said outlet port, a valve seat in said casing adjacent said inlet port, a piston having a valve head at one end slidably mounted in said casing between said outlet port and said seat, resilient means normally retaining said valve head on said seat, a pressure chamber between said seat and said inlet port, said piston having bores therethrough providing communication between said pressure chamber and said outlet port and normally closed when said valve head is seated, an auxiliary valve head in said cavity, resilient means normally urging said auxiliary valve head to seal the reduced diameter bore, a valve stem extending through said reduced diameter bore and said longitudinal bore abutting at one end against said main valve head and operatively connected at its other end to said auxiliary valve head, said stem being of length such that when the main valve head is seated the auxiliary valve head will be spaced from the adjacent end of said reduced diameter bore, and of diameter to permit flow through said reduced diameter bore into said bleeder port when the auxiliary valve head is spaced from said end, and means associated with said piston upon liquid flow to produce suction by venturi effect to overbalance the resilient means associated with the main valve head, whereby when the liquid flow rate falls below a predetermined amount required to overbalance said resilient means said main valve will close to open said auxiliary valve for bleeding of liquid and gas from said bleeder port.

12. The combination set forth in claim 11 in which a piston is positioned in said longitudinal bore between said valve seat and said reduced bore, said piston being of diameter slightly less than that of said longitudinal bore to provide clearance therebetween, said piston having an axial bore through which said stem extends, means affixed to said stem on each side of said piston to permit movement of said piston with respect to said stem, the resilient means associated with said auxiliary valve head comprising a coil spring compressed between the piston and the end of the enlarged portion of the longitudinal bore, said coil spring being of lesser strength than the resilient means associated with the main valve head.

13. The combination set forth in claim 11 in which a porous block is positioned in said longitudinal bore aligned with said inlet bore, said block having an axial bore through which said stem extends.

14. The combination set forth in claim 11 in which a porous circular block is positioned in said longitudinal bore aligned with said inlet bore, said block having an axial bore through which said stem extends and a circular cavity aligned with the inlet port, and a plug in said inlet port is affixed at one end in said cavity.

15. The combination set forth in claim 11 in which the cavity is in communication with said longitudinal bore through a passageway having its inlet end adjacent the end of said longitudinal bore adjacent the inlet of the reduced diameter bore.

16. The combination set forth in claim 11 in which said piston has a skirt at one end defining a cavity and the resilient means associated with the main valve head comprises a coil spring in said cavity.

References Cited in the file of this patent

UNITED STATES PATENTS

| | | |
|---|---|---|
| 104,593 | Hovey | June 21, 1870 |
| 323,992 | Wilcox | Aug. 11, 1885 |
| 358,148 | Desmond | Feb. 22, 1887 |
| 1,440,808 | Wineman | Jan. 2, 1923 |
| 1,478,600 | Dunspel | Oct. 16, 1923 |
| 1,553,940 | Kangieser | Sept. 15, 1925 |
| 1,775,362 | Demarcus | Sept. 9, 1930 |
| 1,908,357 | Hornschurch | May 9, 1933 |
| 1,934,758 | Temple | Nov. 14, 1933 |
| 2,034,914 | Lancer | Mar. 24, 1936 |
| 2,061,517 | Kenny | Nov. 17, 1936 |
| 2,108,272 | Seyforth | Feb. 15, 1938 |
| 2,152,695 | Hornschurch | Apr. 4, 1939 |
| 2,157,596 | Dorrs | May 9, 1939 |
| 2,223,699 | Norgren | Dec. 3, 1940 |
| 2,231,341 | Lichte | Feb. 11, 1941 |
| 2,318,962 | Parker | May 11, 1943 |
| 2,394,987 | Deming | Feb. 19, 1946 |
| 2,397,664 | Hillier | Apr. 2, 1946 |
| 2,399,996 | Fitch | May 7, 1946 |
| 2,503,424 | Snyder | Apr. 11, 1950 |

FOREIGN PATENTS

| | | |
|---|---|---|
| 25,388 | Australia | Nov. 20, 1930 |